United States Patent
Kohlenberg et al.

(10) Patent No.: US 6,229,089 B1
(45) Date of Patent: May 8, 2001

(54) INLET POWER FEED FOR LONGITUDINALLY SLOTTED CURRENT CONTACT LINES

(75) Inventors: Thomas Kohlenberg, Wetter; Uwe Lichtenvort, Essen; Klaus-Dieter Oemus, Hemer; Michael Röhr, Dortmund; Uwe Schulte, Wetter, all of (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/271,697

(22) Filed: Mar. 18, 1999

(30) Foreign Application Priority Data

Apr. 17, 1998 (DE) .............................. 198 17 934

(51) Int. Cl.$^7$ .................................................... H01B 7/12
(52) U.S. Cl. ..................... 174/70 B; 174/40 R; 174/43; 174/52.4; 174/92; 174/137 R
(58) Field of Search .................................. 174/40 R, 43, 174/52.4, 70 B, 92, 137 R, 138 R, 163 R

(56) References Cited

U.S. PATENT DOCUMENTS

| | | | |
|---|---|---|---|
| 3,325,591 | 6/1967 | Wahl | 174/138 |
| 3,337,697 | 8/1967 | Martin et al. | 191/23 |
| 4,090,594 | 5/1978 | Ross, Jr. | 191/23 |
| 4,883,919 | * 11/1989 | Abele | 174/93 |
| 5,113,038 | * 5/1992 | Dehling | 174/92 |
| 5,124,507 | * 6/1992 | Dehling | 174/92 |
| 5,162,616 | * 11/1992 | Swaffield et al. | 174/99 B |
| 5,322,973 | * 6/1994 | Dagan | 174/92 |
| 5,886,300 | * 3/1999 | Strickler | 174/135 |
| 5,962,811 | * 10/1999 | Rodiguez et al. | 174/76 |

OTHER PUBLICATIONS

Publication "Multiconductor" issued by the company Akapp, No Date.

\* cited by examiner

*Primary Examiner*—Dean A. Reichard
*Assistant Examiner*—Adolfo Nino
(74) *Attorney, Agent, or Firm*—Henry M. Feiereisen

(57) ABSTRACT

An inlet power feed for longitudinally slotted current contact lines having conductor rails disposed in a longitudinal direction inside an elongated plastic profile, includes a cover defining an inlet feed region and electrically insulating the inlet feed region to the outside, with the cover receiving a power supply cable which terminates at a location above the elongate plastic profile. The power supply cable includes a plurality of cores for connection to a plurality of conductor rails in one-to-one correspondence. Electrically connecting the cores of the cable to the conductor rails are a plurality of flat junction bars, each of the junction bars connecting one core of the cable to one conductor rail and having a flat side which confronts an outer side wall of the elongate plastic profile and, at least partially, bears in flat engagement on the outer side wall, with the junction bar extending inside the cover from the conductor rail vertically upwards into the area above the elongate plastic profile.

18 Claims, 6 Drawing Sheets

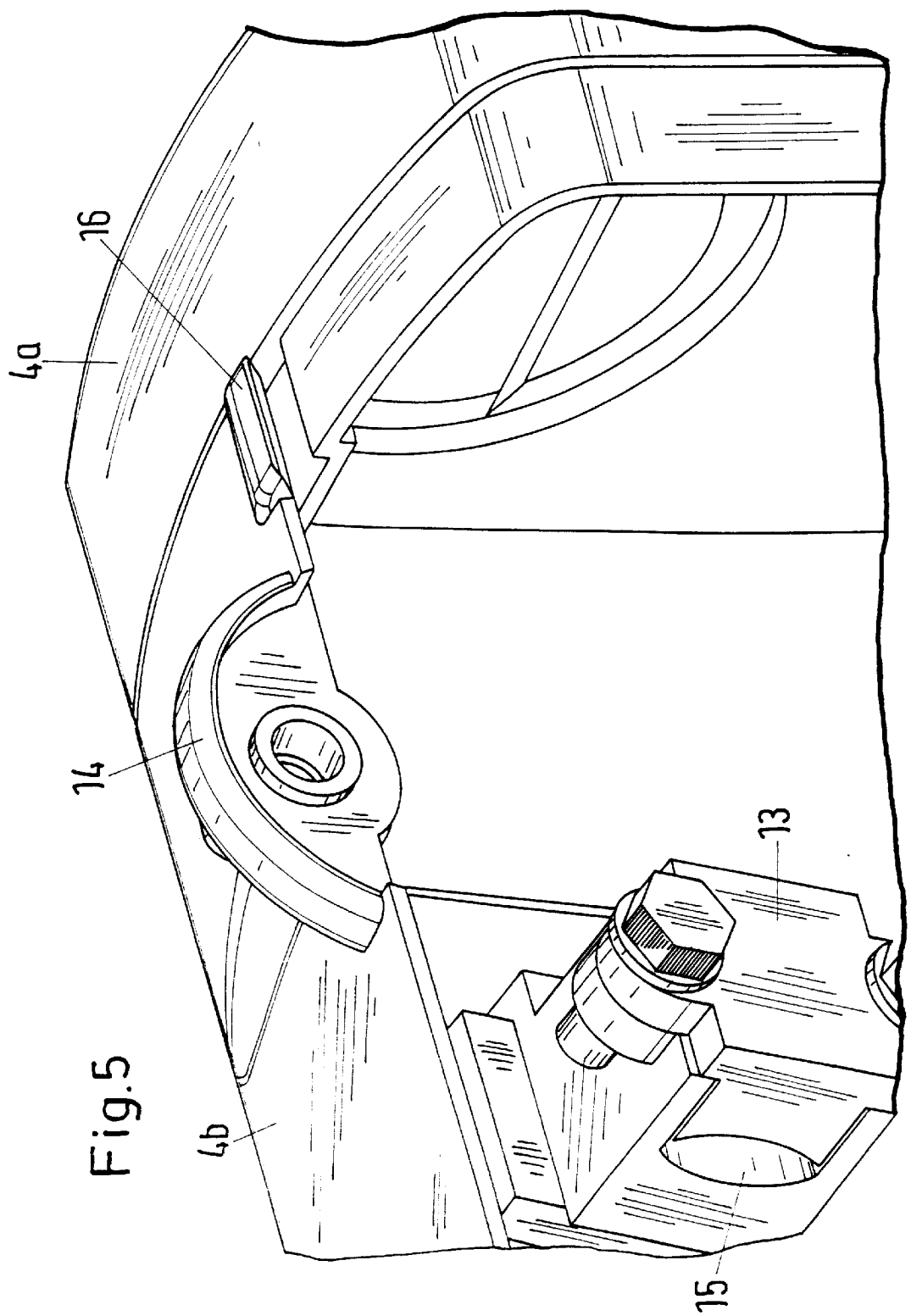

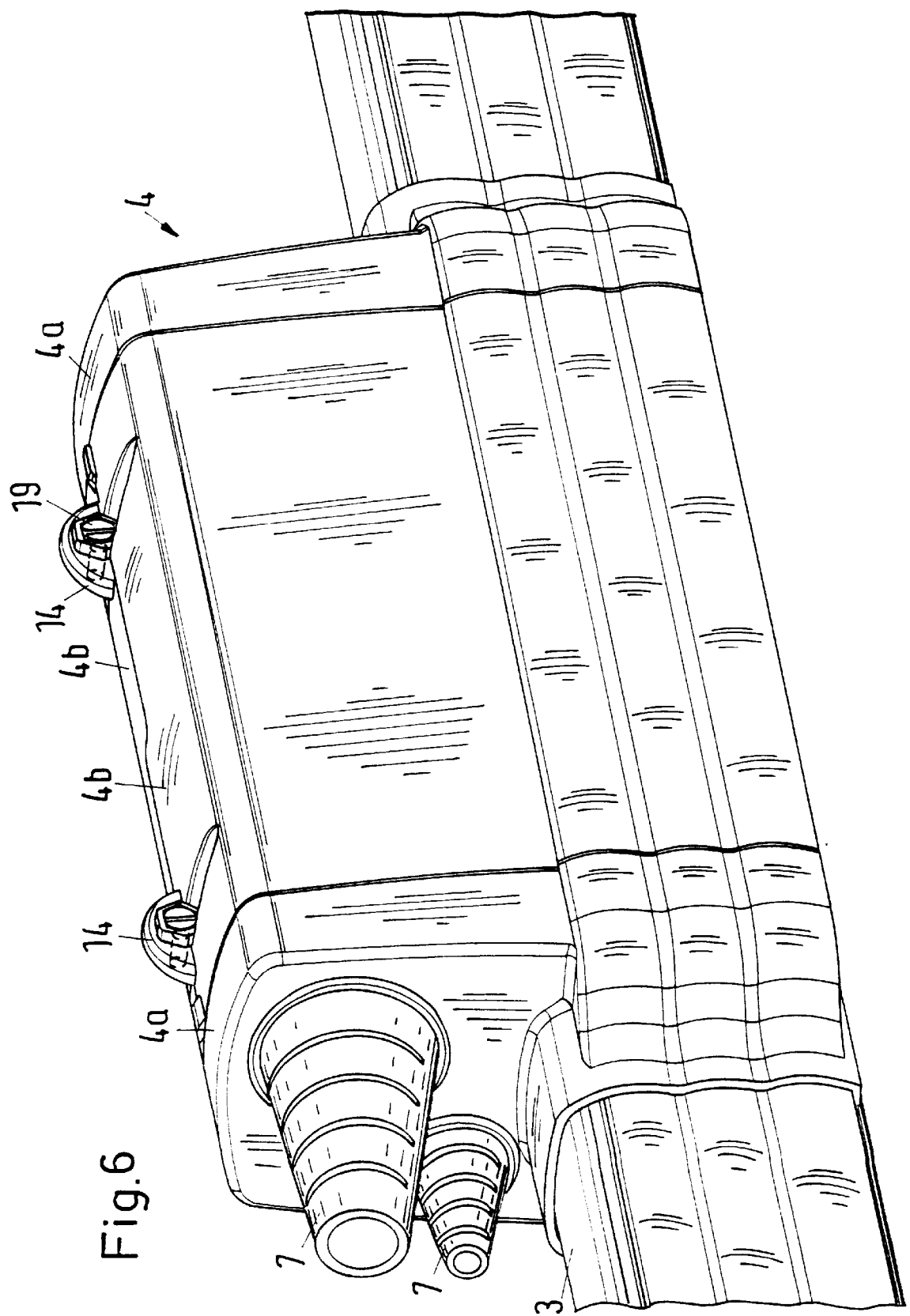

INLET POWER FEED FOR LONGITUDINALLY SLOTTED CURRENT CONTACT LINES

CROSS-REFERENCES TO RELATED APPLICATIONS

This application claims the priority of German Patent Application Serial No. 198 17 934.0, filed Apr. 17, 1998, the subject matter of which is incorporated herein by reference.

BACKGROUND OF THE INVENTION

The present invention relates to an inlet power feed for longitudinally slotted current contact lines.

U.S. Pat. No. 3,337,697 describes an inlet power feed for longitudinally slotted current contact lines of a type having an elongate plastic profile formed with an opening through which a terminal clip is connectable to the core of a multi-core cable, with the inlet feed region being enclosed by an insulating housing. Further provided is a conductor bar which extends vertically upwards into the area above the plastic profile.

U.S. Pat. No. 4,090,59 describes a junction bar of flat configuration.

A publication, issued by the company Akapp and entitled "Multiconductor" discloses an inlet power feed for current contact lines which are made of elongate profiles of PVC to form a housing for receiving current conductor rails. In the area of the inlet power feed, terminal clips are arranged on the conductor rails and guided to the outside through an opening in the housing. Each clip and thus each conductor rail is connected in electrically conductive manner with a core of a power supply cable. The inlet feed region is additionally protected by an additional housing cover by which the inlet feed region is simultaneously insulated against the outside. The multi-core cable projects through the housing cover and is secured thereon. A drawback of this type of inlet power feed is its relative wide size. As a result, a placement of several contact lines in side-by-side disposition proved in particular very difficult. Moreover, the inlet power feed is difficult to install, as the relatively thick cores of the power supply cable must be considerably bent for realizing an attachment to the clips.

SUMMARY OF THE INVENTION

It is thus an object of the present invention to provide an improved inlet power feed, obviating the afore-stated drawbacks.

In particular, it is an object of the present invention to provide an improved inlet power feed which exhibits a slender configuration and significantly simplifies the installation.

These objects, and others which will become apparent hereinafter, are attained in accordance with the present invention by providing a cover which electrically insulates the inlet feed region to the outside and receives a power supply cable which terminates at a location above the elongate plastic profile and includes a plurality of cores for connection to a plurality of conductor rails in one-to-one correspondence, and a plurality of flat conductive junction bars, each of the junction bars connecting one core of the cable to one conductor rail and having a flat side which confronts an outer side surface of the elongate plastic profile and, at least partially, bears in flat engagement on the outer side surface, whereby the junction bar extends inside the cover from the conductor rail vertically upwards into the area above the elongate plastic profile.

Through the provision of a flat junction bar, the attachment to the power supply cable can be shifted into the area above the elongate plastic profile so that the inlet power feed can be designed of very slender configuration. Moreover, there is no need to bend the cores of the power supply cable for attachment of the associated junction bar; rather, a simple spreading of the cores will suffice.

According to another feature of the present invention, the assembly is further simplified by so configuring the junction bar that the lower end is formed by a leg which extends in longitudinal direction so that the junction bar has a substantially L-shaped configuration, with the leg of the junction bar being adapted for flat engagement in electrically conductive manner upon the conductor rail. The L-shaped configuration of the junction bar results in a flat engagement over a large area with the conductor rail and is easy to mount. In addition, the L-shaped junction bar can be held against the conductor rail in a simple fashion by a U-shaped clamp which embraces the conductor rail.

Preferably, the leg of the junction bar is pressed against the conductor rail by a screw fastener which extends transversely to the longitudinal direction and is supported on the plastic profile distal side of the clamp. This is advantageous, as the clamp can be pre-assembled to subsequently realize a simple and secure connection. The assembly can be further simplified by inserting the leg in a lateral opening of the clamp.

According to another feature of the present invention, the junction bar has an upper end which has attached thereon a clip for securement of a core of the cable in an electrically conductive manner. Thus, the cores can be connected easily with the associated junction bars on site with few manipulations.

In order to reduce the complexity of fabrication for the cover, the cover is designed in the form of a connector sleeve having ends spaced form one another in longitudinal direction to confine the inlet feed region and circumscribing the elongate plastic profile in a form-fitting manner. In this manner, a cover may be producible of few components and is easy to assemble on site.

According to still another feature of the present invention, the cover has a main body which is split in longitudinal direction into two identical body halves which are so configured as to be lockable at the ends. Moreover, the main body is connectable on both ends to identical end pieces. In this manner, the number of components is reduced and the assembly is less complex. Suitably, the main body is detachably connected to the end pieces by appropriate locking elements.

BRIEF DESCRIPTION OF THE DRAWING

The above and other objects, features and advantages of the present invention will now be described in more detail with reference to the accompanying drawing, in which:

FIG. 5 is a top and side perspective view of the cover of FIG. 4, illustrating in detail the locking mechanism between the main body and one of the end pieces in the form of a snap element; and FIG. 6 is a top and side perspective view of the inlet power feed with fully closed cover.

DETAILED DESCRIPTION OF PREFERRED EMBODIMENTS

Figure 1:
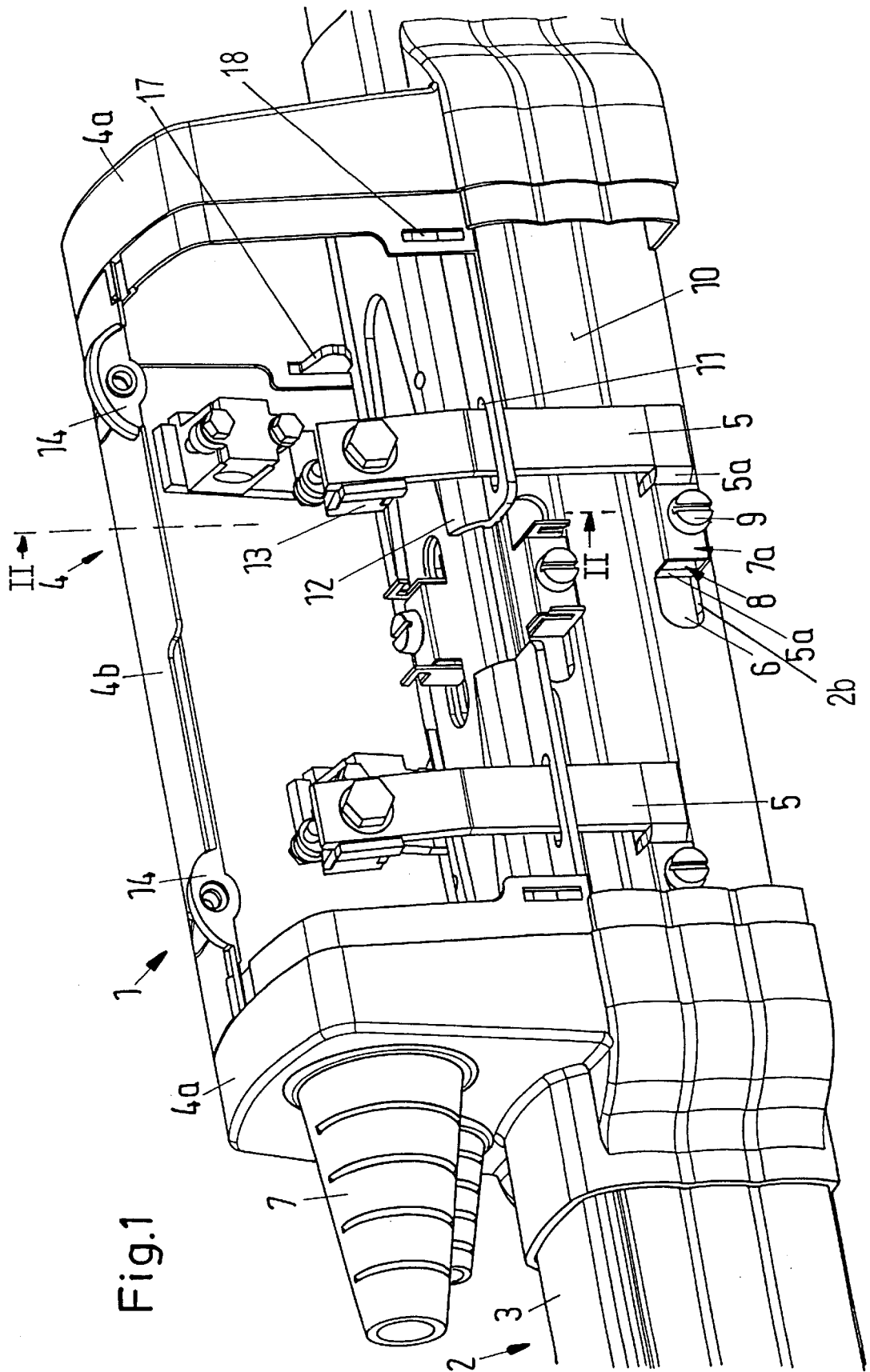
FIG. 1 is a top and side perspective view of an inlet power feed according to the present invention in conjunction with a current contact line for power supply to the contact line, with a body half of the cover of the inlet power feed being removed for illustrating internal components thereof.

Throughout all the Figures, same or corresponding elements are generally indicated by same reference numerals.

Turning now to the drawing, and in particular to FIG. 1, there is shown a top and side perspective view of an inlet power feed according to the present invention, generally designated by reference numeral 1 for power supply to a current contact line 2 which has a bottom formed with a longitudinal slot (not shown). The contact line 2 includes an elongate plastic profile 3 to form a casing. Formed interiorly of the plastic profile 3 are anchoring grooves 2a (FIG. 2) which extend in longitudinal direction and accommodate current conductor rails 6 for cooperation with a trolley (not shown) traveling during operation longitudinally inside the current contact line 2.

The inlet power supply 1 includes a cover 4 which forms a housing and is comprised of a central main body 4b extending between opposite end pieces 4a spaced-apart in longitudinal direction of the contact line 2. As shown in particular in FIG. 5, the main body 4b is detachably mounted to the end pieces 4a by a locking mechanism in the form of complementary snap-on locking elements 16 on the main body 4b and undercuts 13a on the end pieces 4a. In this manner, the main body 4b and the end pieces 4a of the cover 4 can be detachably connected to one another. The main body 4b is split in the middle and thus composed of two identical body halves which are formed with bottom catches 17 for engagement in complementary holes 18 in the end pieces 4a to thereby accurately position the body halves 4b for subsequent interlocking engagement with the end pieces 4a via the locking elements 16, 13a. In addition, the body halves 4b are provided on top with particular tabs 14 for receiving screws 19 (FIG. 6) to thereby secure the body halves 4b to one another.

Figure 4:
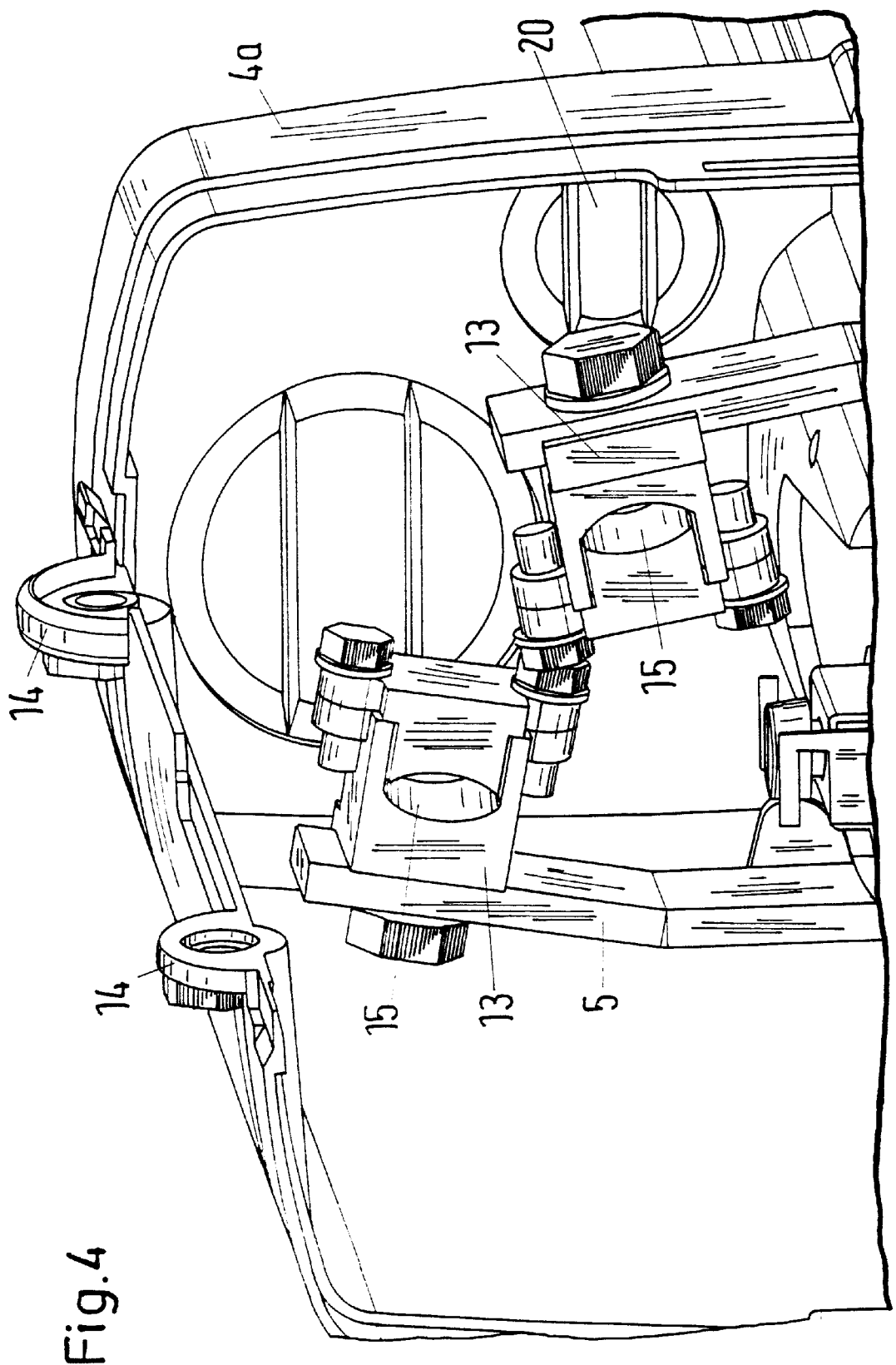
FIG. 4 is a fragmentary top and side perspective view, on an enlarged scale, of the inlet power feed, with a body half of the cover being removed to show a connection between the main body of the cover and an end piece of the cover and to show a clip for attachment of a cable core.

One of the end pieces 4a has formed thereon two funnel-shaped cable support sleeves 7 which project out for so directing a multicore power supply cable (not shown) into the interior space of the cover 4 above the elongate plastic profile 3 that the cable terminates within the cover 4. The number of sleeves 7 formed on the end piece 4b is shown by way of example only and may be modified, if necessary. The sleeves 7 are so constructed as to allow conformity to different cable diameters by simply cutting the sleeve 7 at the appropriate location whereby the cable enters the interior of the cover 4 through a complementary opening (not shown) in the end piece 4a. Suitably, the opening is realized by pushing out an appropriate wall portion 20 of the end piece 4a, as shown in FIG. 4. In this manner, the openings are sealed watertight until being pushed open for passage of the cable.

In FIG. 1, the front body half 4b is removed to show internal components of the inlet power feed 1. As illustrated, the inlet power feed 1 includes conductive junction bars 5 positioned upon the contact line 2 within the cover 4 for electrically connecting the conductor rails 6 to the cores of the cable whereby one junction bar 5 is used for connection of one conductor rail 6 to one cable core. As the junction bars 5 are of an identical construction, it will be appreciated by persons skilled in the art that the following description with respect to one of the junction bars 5 is equally applicable to the other junction bars.

Each junction bar 5 is formed as flattened wire of rectangular cross section and extends within the cover 4 from the associated one of the conductor rails 6 upwardly in vertical direction into the area above the plastic profile 3 for electric connection to the associated one of the cable cores. As best seen in FIG. 1, the junction bars 5 extend with on flat side in opposition to an outer side wall 10 of the elongate plastic profile 3 and, at least partially, bear in flat engagement on the outer side wall 10. Suitably, each junction bar 5 is guided through and held in place outside the side wall 10 by an oblong slot 11 which is formed in a prolongation 12 jutting out from the respective end piece 4a alongside the plastic profile 3.

Figure 3:
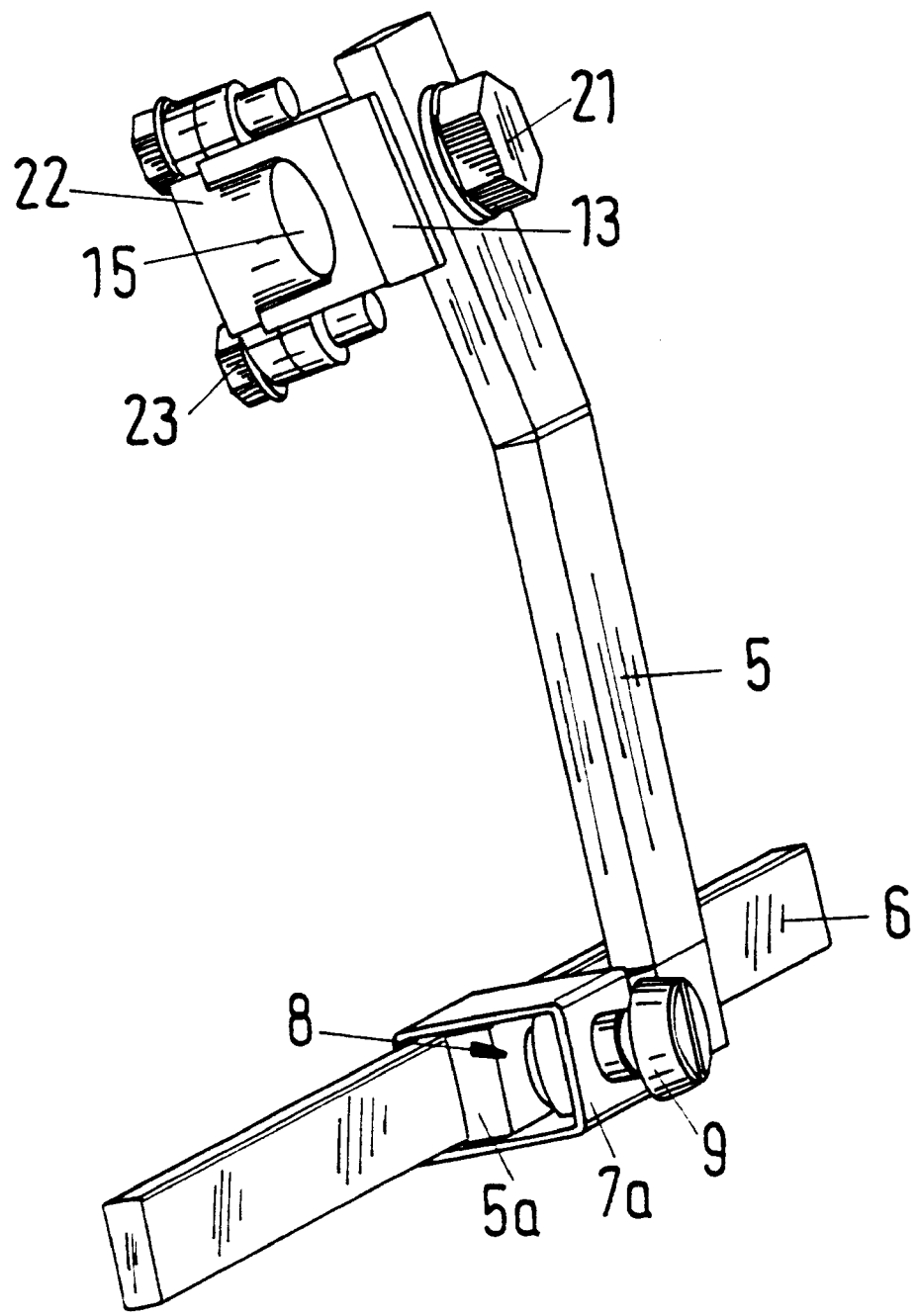
FIG. 3 is a perspective view of a junction bar in contact with a conductor rail by means of a clamp.

As shown in particular in FIG. 3, the junction bar 5 has a substantially L-shaped configuration to form an angled lower leg 5a which extends in longitudinal direction of the contact line 2. The leg 5a is in flat, electrically conductive, engagement upon the outside surface of the conductor rail 6 and is held in place by a U-shaped clamp 7a which projects through an opening 2b of the plastic profile 3 and embraces the conductor rail 6. The clamp 7a is open on both ends (opening 8) as viewed in longitudinal direction of the contact line, with the leg 5a insertable through the opening 8 into the clamp 7a and pressed against the conductor rail 6 by a screw fastener 9. The screw fastener 9 extends transversely to the longitudinal direction and is captivated on the plastic profile distal side of the clamp 7a in a thread formed therein.

Figure 2:
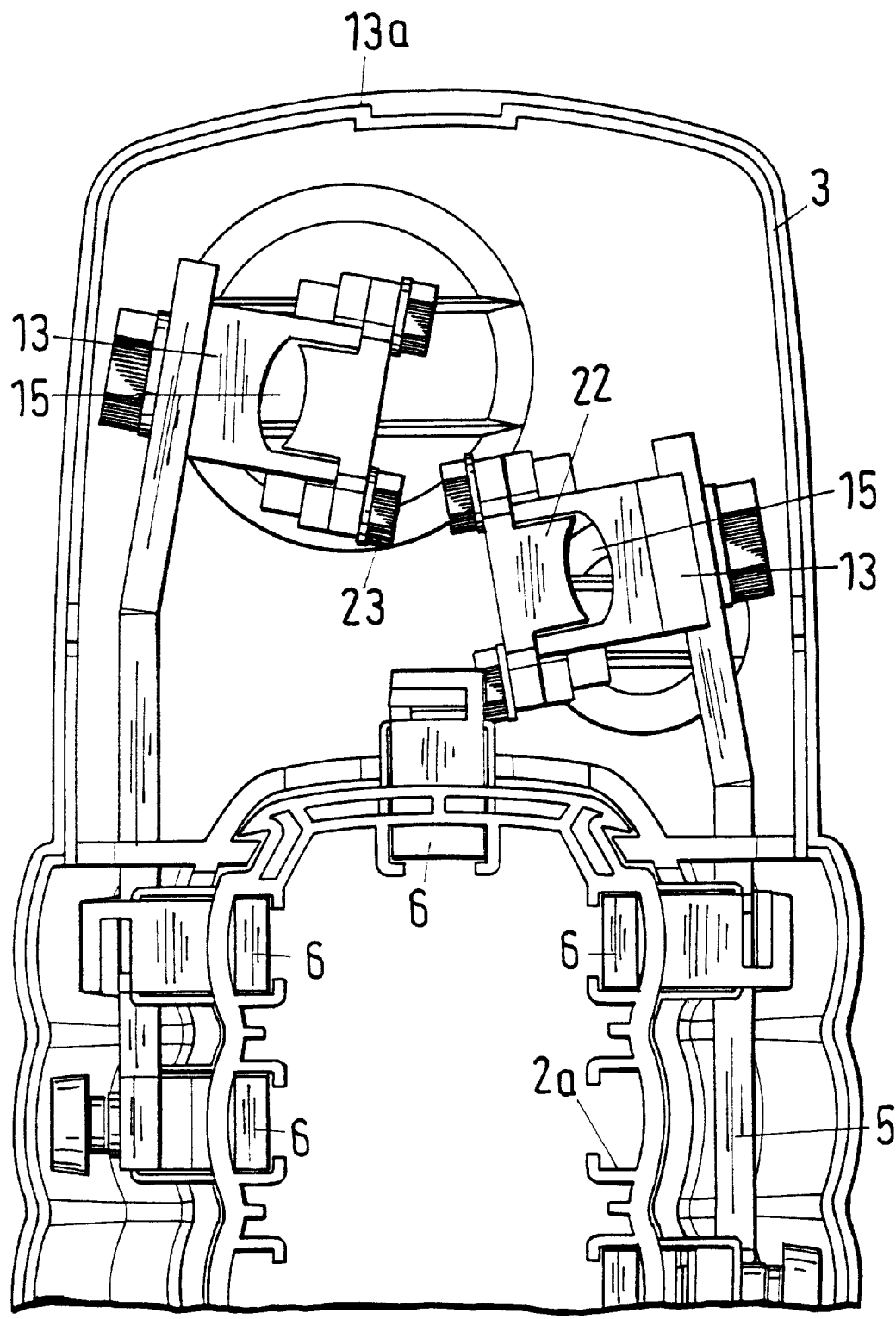
FIG. 2 is a cross sectional view through the inlet power feed and contact line taken along the line 11—11 in FIG. 1.

At the upper end thereof, each junction bar 5 includes a clip 13 which is secured by a screw fastener 21 to the junction bar 5 and provided for establishing an electric connection to a core of the cable by inserting the core into an opening 15 of the clip 13, as best seen in FIGS. 2 and 3. Suitably, the size of the opening 15 can be conformed to the dimension of the inserted core by an adjusting mechanism 22 via screws 23. After placement of the core in the opening 15, tightening of the screw 21 realizes a secure clamping of the core therein. The cores of the power supply cable extend essentially in longitudinal direction of the contact line 2 so that installation requires only a slight bending of the cores.

Installation of the junction bars 5 is realized by initially guiding them through the respective slots 11 for proper placement. Subsequently, the legs 5a are secured against the conductor rails 6 and the cores are attached in the openings 15 of the clips 13. After installation of the junction bars 5, the body halves of the cover 4 are snapped onto the end pieces 4a and secured together by the screws 19 to enclose the inlet power feed region, as shown in FIG. 6.

The cover 4 is formed as a connector sleeve that envelopes the inlet feed region with its end pieces 4a which embrace the plastic profile in form-fitting manner. As the main body 4b is split into two identical body halves that lock into the undercuts 13a of the end pieces 4a, the inlet power feed 1 can be pre-fabricated with the main body 4b and secured against inadvertent dropping from the plastic profile 3. Additionally, the body halves 4b are secured on top by the screwed connections at the tabs 14. Thus, the cover 4 is comprised only of two housing components 4a, 4b which form the cover 4 through disposition in pairs.

While the invention has been illustrated and described as embodied in an inlet power feed for longitudinally slotted current contact lines, it is not intended to be limited to the details shown since various modifications and structural changes may be made without departing in any way from the spirit of the present invention.

What is claimed as new and desired to be protected by letters patent is set forth in the appended claims:

What is claimed is:

1. An inlet power feed for longitudinally slotted current contact lines having conductor rails disposed in a longitudinal direction inside an elongated plastic profile, said inlet power feed comprising:

a cover defining an inlet feed region and electrically insulating the inlet feed region to the outside, said cover receiving a power supply cable which terminates at a location above the elongate plastic profile and includes a plurality of cores for connection to a plurality of conductor rails in one-to-one correspondence; and connection means for electrically connecting the cores of the cable to the conductor rails, said connection means including a plurality of flat junction bars, each of the junction bars connecting one of the cores of the cable to one of the conductor rails and having a flat side which confronts an outer side wall of the elongate plastic profile and, at least partially, bears in flat engagement on the outer side wall, each said junction bar extending inside the cover from the one conductor rail vertically upwards into the area above the elongate plastic profile.

2. The inlet power feed of claim 1 wherein each said junction bar has a lower end formed by a leg which extends in the longitudinal direction so that each said junction bar has a L-shaped configuration, said leg of each said junction bar being adapted for flat engagement in electrically conductive manner upon the one conductor rail.

3. The inlet power feed of claim 2 wherein the connection means includes a clamp of U-shaped configuration, said clamp embracing the one conductor rail through an opening of the plastic profile for holding the leg of each said junction bar in place.

4. The inlet power feed of claim 3 wherein the clamp has one side distal to the plastic profile, said connection means including a screw fastener supported on the one side of the clamp and extending transversely to the longitudinal direction for pressing the leg of each said junction bar against the one conductor rail.

5. The inlet power feed of claim 3 wherein the leg is insertable in a lateral opening of the clamp.

6. The inlet power feed of claim 1 wherein each said junction bar has an upper end, said connection means including a cable clip disposed on the upper end of the each said junction bar for securement of the one core in an electrically conductive manner.

7. The inlet power feed of claim 1 wherein the cover is configured as a connector sleeve and has opposite end pieces spaced apart in the longitudinal direction for demarcating the inlet feed region, said end pieces embracing the elongated plastic profile in a form-fitting manner.

8. The inlet power feed of claim 7 wherein the cover has a main body which is split in the longitudinal direction to define two identical body halves, said body halves of the main body being so constructed as to be lockable to the end pieces of the cover.

9. The inlet power feed of claim 7 wherein the end pieces of the cover are of identical configuration, said cover including a main body having opposite ends for securement to the end pieces.

10. The inlet power feed of claim 8, and further comprising locking means for detachable securement of the main body to the end pieces.

11. In combination:

a contact line having an elongate plastic profile for accommodating a conductor rail;

a cover for attachment to the plastic profile in such a manner as to define an inlet feed region;

a power supply cable projecting into the inlet feed region of the cover at a location above the plastic profile and having a core for connection to the conductor rail; and a flat junction bar for electrically coupling the core of the cable to the conductor rail, said junction bar extending within the cover in vertical direction outside of the plastic profile and having a flat side which confronts a side wall of the elongate plastic profile and, at least partially, bears externally in flat engagement on the side wall, said junction bar having a lower end in conductive engagement with the conductor rail through an opening in the plastic profile and an upper end in conductive engagement with the core.

12. The combination of claim 11 wherein the junction bar has a L-shaped configuration with the lower end extending in the longitudinal direction for flat engagement in electrically conductive manner upon the conductor rail.

13. The combination of claim 11 wherein the junction bar includes a clamp of U-shaped configuration, said clamp embracing the conductor rail for holding the lower end in place.

14. The combination of claim 13 wherein the junction bar includes a screw fastener supported on a plastic profile distal side of the clamp and extending transversely to the longitudinal direction for pressing the lower end of the junction bar against the conductor rail.

15. The combination of claim 13 wherein the lower end is insertable in a lateral opening of the clamp.

16. The combination of claim 11 wherein the junction bar includes a cable clip secured to the upper end of the junction bar for attachment of the core in an electrically conductive manner.

17. The combination of claim 11 wherein the cover includes a main body split in the longitudinal direction for defining two body halves, and spaced-apart end pieces, said main body having opposite ends for connection to the end pieces.

18. The combination of claim 17 wherein the end pieces embrace the plastic profile in a form-fitting manner.

* * * * *